(12) United States Patent
Saito et al.

(10) Patent No.: US 8,391,671 B2
(45) Date of Patent: Mar. 5, 2013

(54) INFORMATION PROCESSING DEVICE AND METHOD, RECORDING MEDIUM, AND PROGRAM

(75) Inventors: Naoki Saito, Kanagawa (JP); Yusuke Sakai, Kanagawa (JP); Mikio Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1026 days.

(21) Appl. No.: 11/658,833

(22) PCT Filed: Jul. 20, 2005

(86) PCT No.: PCT/JP2005/013295
§ 371 (c)(1),
(2), (4) Date: Nov. 14, 2008

(87) PCT Pub. No.: WO2006/011401
PCT Pub. Date: Feb. 2, 2006

(65) Prior Publication Data
US 2009/0202223 A1    Aug. 13, 2009

(30) Foreign Application Priority Data
Jul. 27, 2004  (JP) ................ P2004-218533

(51) Int. Cl.
*H04N 9/80* (2006.01)
(52) U.S. Cl. ..................................... 386/239
(58) Field of Classification Search .......... 386/201, 386/216, 219, 239, 220, 246, 248, 262, 353
See application file for complete search history.

(56) References Cited

U.S. PATENT DOCUMENTS 5,808,662 A * 9/1998 Kinney et al. ............... 348/14.1
(Continued)

FOREIGN PATENT DOCUMENTS

| JP | 61 199178 | 9/1986 |
| JP | 11 44703 | 2/1999 |

(Continued)

OTHER PUBLICATIONS

A Real-Time Realization of Geometrical Valid View Synthesis for Tele-conferencing with Viewpoint Adaption by B.J. Lei and E.A. Hendriks (3D Data Processing Visualization and Transmission, 2002. Proceedings. First International Symposium on. p. 327-336).*

(Continued)

*Primary Examiner* — Tat Chio
(74) *Attorney, Agent, or Firm* — Oblon, Spivak, McClelland, Maier & Neustadt, L.L.P.

(57) ABSTRACT

Content that is simultaneously viewed by users of remotely located communication apparatuses is recorded along with images and sound corresponding to the users, for a synthesized reproduction. Synthesis information including parameters relating to setting a synthesis situation of an image and sound of the content and an image and sound of the users, along with information representative of a standard time, is produced and stored. The content being played back is recorded with the standard time added thereto. Similarly, real-time recording of the users includes the standard time. The synthesis information is produced again and stored when a parameter relating to setting the synthesis situation is changed.

7 Claims, 8 Drawing Sheets

U.S. PATENT DOCUMENTS

| | | | |
|---|---|---|---|
| 5,912,710 A * | 6/1999 | Fujimoto | 348/445 |
| 6,269,122 B1 * | 7/2001 | Prasad et al. | 375/240.28 |
| 6,546,188 B1 * | 4/2003 | Ishii et al. | 386/280 |
| 7,187,842 B2 * | 3/2007 | Ninomiya | 386/288 |
| 2006/0023949 A1 | 2/2006 | Saito et al. | |
| 2006/0025998 A1 | 2/2006 | Sakai et al. | |
| 2006/0026207 A1 | 2/2006 | Sakai et al. | |
| 2006/0031682 A1 | 2/2006 | Sakai et al. | |

FOREIGN PATENT DOCUMENTS

| | | |
|---|---|---|
| JP | 2001-148841 | 5/2001 |
| JP | 2001 148841 | 5/2001 |
| JP | 2002 507027 | 3/2002 |
| JP | 2003-150529 | 5/2003 |
| JP | 2003 150529 | 5/2003 |
| JP | 2003 271530 | 9/2003 |
| JP | 2004 88327 | 3/2004 |

OTHER PUBLICATIONS

Office Action issued Jan. 20, 2011, in Japan Patent Application No. 2004-218533.

U.S. Appl. No. 11/572,593, filed Jan. 24, 2007, Saito, et al.
U.S. Appl. No. 11/658,476, filed Jan. 25, 2007, Saito, et al.
U.S. Appl. No. 11/572,597, filed Jan. 24, 2007, Sakai, et al.
U.S. Appl. No. 11/658,833, filed Jan. 29, 2007, Saito, et al.

* cited by examiner

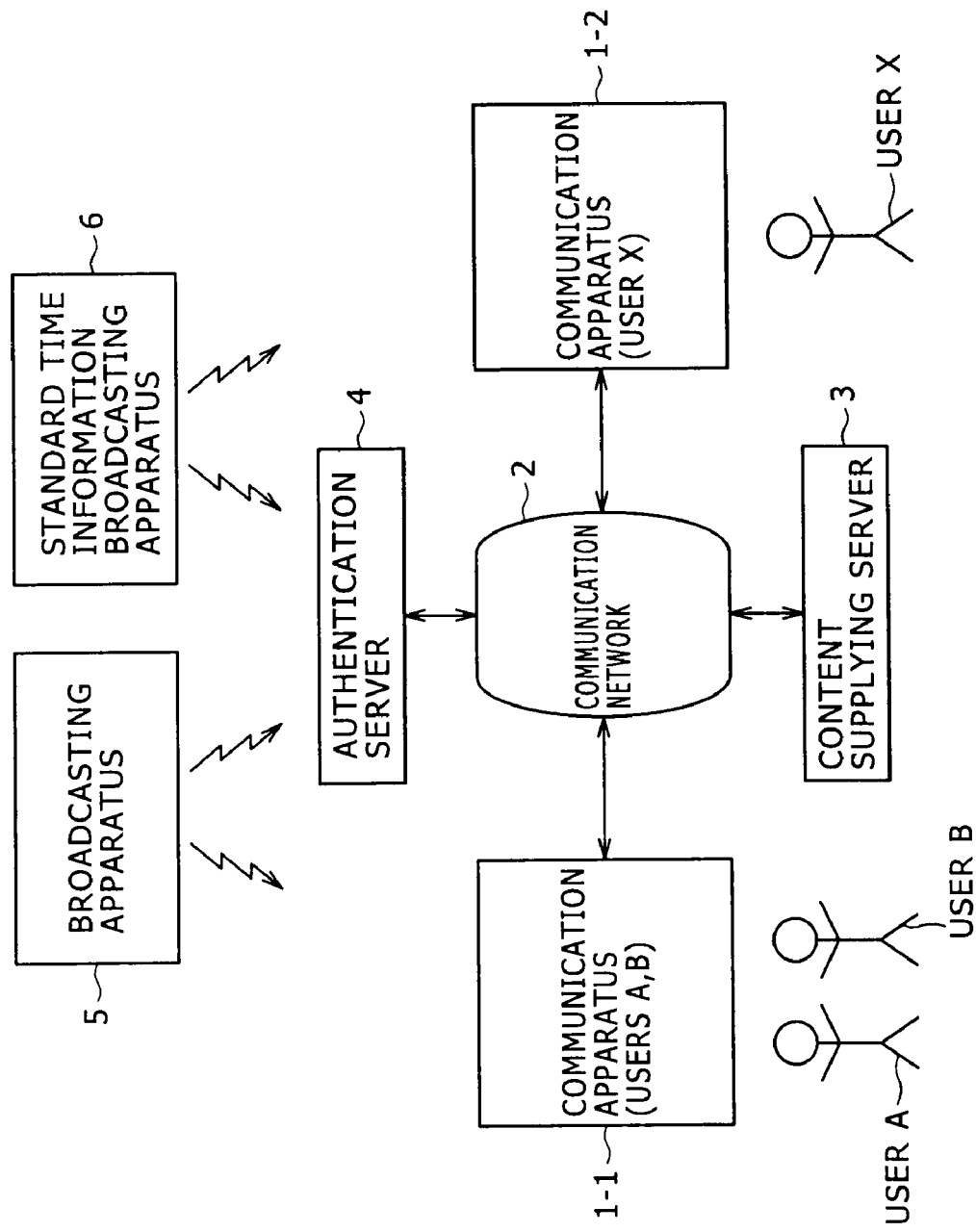

CONTENT IMAGE

IMAGE OF USER A

IMAGE OF USER X

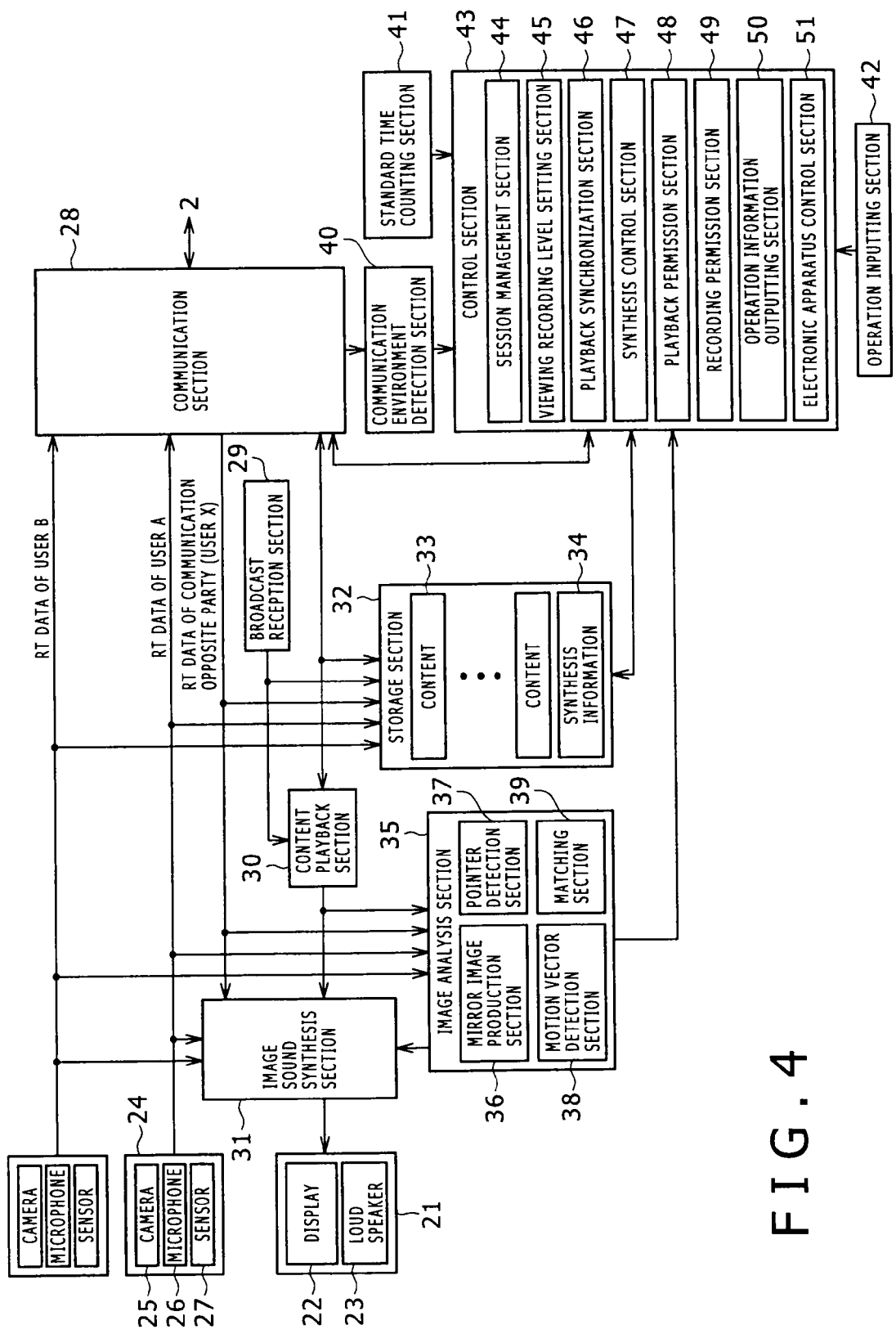
F I G . 4

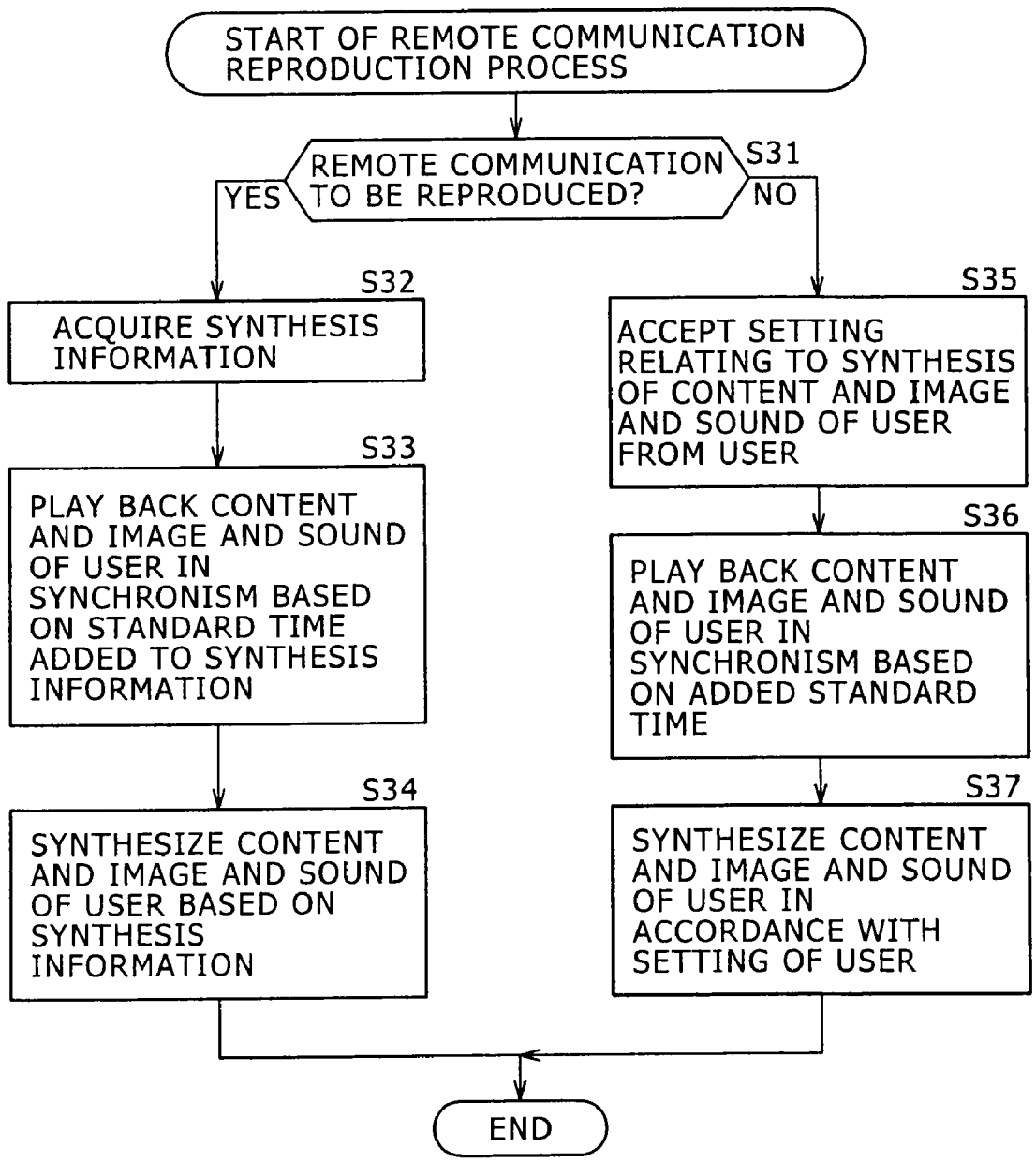

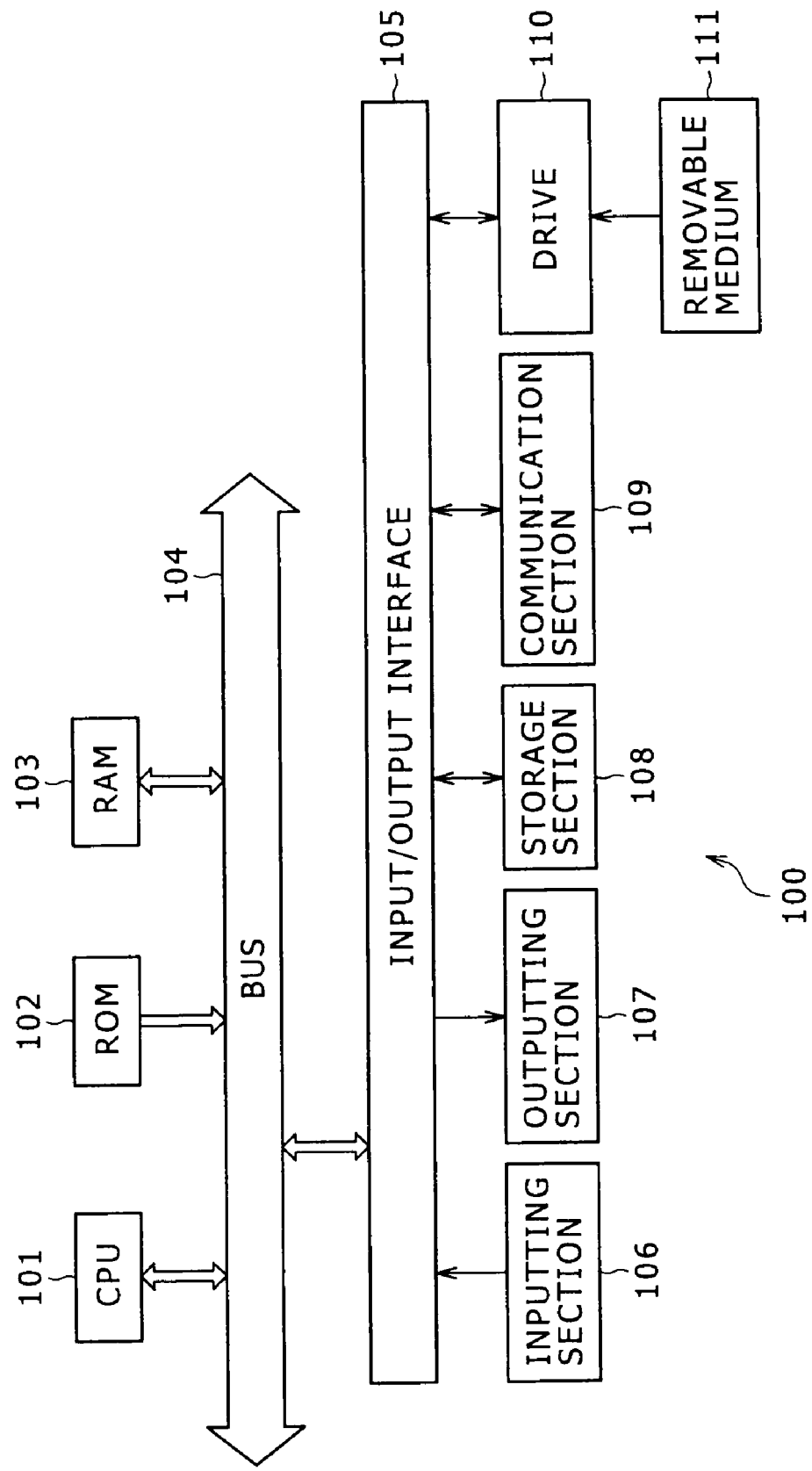

INFORMATION PROCESSING DEVICE AND METHOD, RECORDING MEDIUM, AND PROGRAM

TECHNICAL FIELD

This invention relates to an information processing apparatus and method, a recording medium, and a program, and particularly to an information processing apparatus which communicates sound and an image of a user with a different information processing apparatus connected thereto through a network and plays back the same content in synchronism with the different apparatus and besides records the sound and image of the user and the played back content, and an information processing method, a recording medium, and a program.

BACKGROUND ART

Conventionally, as apparatus for use for exchange between persons at remote places (such exchange is hereinafter referred to as remote communication), a telephone set, a visual telephone set, a video conference system and so forth are available. Also a method wherein a personal computer or the like is used and connected to the Internet to perform text chatting, video chatting which involves an image and sound or the like is available.

Also it has been proposed for persons who try to execute remote communication (such a person as just mentioned is hereinafter referred to as speaker) to use individual personal computers or the like to share a virtual space through the Internet or share the same content (refer to, for example, Patent Document 1).

[Patent Document 1] Japanese Patent Laid-Open No. 2003-271530

DISCLOSURE OF THE INVENTION

Subject to be Solved by the Invention

Also with the prior art, it is possible for speakers at remote places to communicate images and sound of the speakers while viewing the same content (for example, the same television program) and synthesize and output an image and sound of the content and the images and sound of the speakers. If it is tried to record the synthesized images and sound, a first recording method wherein the image and sound of the content and the images and sound of the speakers are recorded individually and a second recording method wherein the image and sound of the content and the images and sound of the users are recorded in a synthesized state are expected.

However, with the first recording method, when playback is performed, since the synthesis state of the image and sound of the content and the images and sound of the speakers is unknown, there is a subject that the images and sound in a synthesized state upon recording cannot be reproduced.

With the second recording method, when playback is performed, although it is possible to reproduce the images and the sound synthesized upon recording, there is a subject that the image and sound of the content and the images and sound of the speakers cannot be synthesized again in a different state from that upon recording.

The present invention has been made in view of such a situation as described above, and it is an object of the present invention to record a content viewed at the same time by speakers at remote places and images and sound of the speakers in such a state that the synthesized state upon recording can be reproduced and the content and the images and sound of the speakers can be played back in a state wherein they are synthesized in a state different from that upon recording.

Means for Solving the Subject

An information processing apparatus of the present invention comprises a playback section configured to play back the same content data in synchronism with a different information processing apparatus, a communication section configured to communicate sound and an image of a user with the different information processing apparatus through a network, a synthesis section configured to synthesize an image and sound of the content data played back by the playback section and the image and sound of the user based on a setting from the user, a storage section configured to store the content data, the image and sound of the user and synthesis information representative of a synthesis situation of the image and sound of the content data and the image and sound of the user, and a reproduction control section configured to control the playback section and the synthesis section based on the synthesis information stored in the storage section to reproduce the synthesis of the image and sound of the content data and the image and sound of the user stored in the storage section.

Time information representative of time at which the synthesis is performed by the synthesis section is added to the content data stored by the storage section and the image and sound of the user and time information representative of time at which the synthesis information is produced or at which the setting of the synthesis situation is changed may be added to the synthesis information.

An information processing method of the present invention includes a playback step of playing back the same content data in synchronism with a different information processing apparatus, a communication step of communicating sound and an image of a user with the different information processing apparatus through a network, a synthesis step of synthesizing an image and sound of the content data played back by the process at the playback step and the image and sound of the user based on a setting from the user, a storage step of storing the content data, the image and sound of the user and synthesis information representative of a synthesis situation of the image and sound of the content data and the image and sound of the user, and a reproduction control step of controlling the playback step and the synthesis step based on the synthesis information stored by the process at the storage step to reproduce the synthesis of the image and sound of the content data and the image and sound of the user stored by the process at the storage step.

A program of a recording medium of the present invention includes a playback step of playing back the same content data in synchronism with a different information processing apparatus, a communication step of communicating sound and an image of a user with the different information processing apparatus through a network, a synthesis step of synthesizing an image and sound of the content data played back by the process at the playback step and the image and sound of the user based on a setting from the user, a storage step of storing the content data, the image and sound of the user and synthesis information representative of a synthesis situation of the image and sound of the content data and the image and sound of the user, and a reproduction control step of controlling the playback step and the synthesis step based on the synthesis information stored by the process at the storage step to reproduce the synthesis of the image and sound of the content data and the image and sound of the user stored by the process at the storage step.

A program of the present invention includes a playback step of playing back the same content data in synchronism with the different information processing apparatus, a communication step of communicating sound and an image of a user with the different information processing apparatus through the network, a synthesis step of synthesizing an image and sound of the content data played back by the process at the playback step and the image and sound of the user based on a setting from the user, a storage step of storing the content data, the image and sound of the user and synthesis information representative of a synthesis situation of the image and sound of the content data and the image and sound of the user, and a reproduction control step of controlling the playback step and the synthesis step based on the synthesis information stored by the process at the storage step to reproduce the synthesis of the image and sound of the content data and the image and sound of the user stored by the process at the storage step.

In the information processing apparatus and method and the programs of the present invention, sound and an image of a user are communicated with the different information processing apparatus through the network, and an image and sound of played back content data and the image and sound of the user are synthesized with one another based on the setting from the user. Further, the content data, the image and sound of the user, and the synthesis information representative of the synthesis situation of the image and sound of the content data and the image and sound of the user are stored. Then, the synthesis of the image and sound of the content data and the image and sound of the user stored is reproduced based on the stored synthesis information.

Effect of the Invention

According to the present invention, a content enjoyed simultaneously by speakers at remote places and images and sound of the speakers can be recorded in such a manner that the synthesized state upon recording can be reproduced and the content and the images and sound of the speakers can be played back in a state different from that upon recording.

BRIEF DESCRIPTION OF THE DRAWINGS

FIG. 1 shows an example of a configuration of a communication system to which the present invention is applied.

FIG. 4 is a block diagram showing an example of a configuration of a communication apparatus of FIG. 1.

FIG. 7 is a flow chart illustrating a remote communication reproduction process.

FIG. 8 is a block diagram showing an example of a configuration of a general purpose personal computer.

Figure 2A:
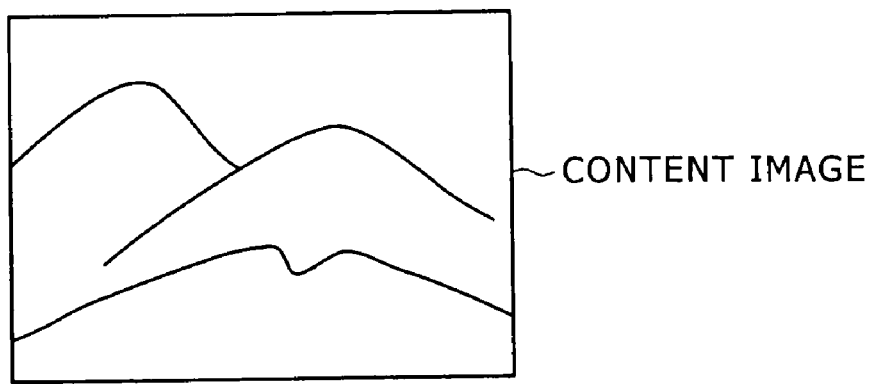
FIG. 2A is a view showing an example of an image of a content and an image of a user.

DESCRIPTION OF REFERENCE NUMERALS 1 communication apparatus, 2 communication network, 3 content supplying server, 4 authentication server, 5 broadcasting apparatus, 6 standard time information supplying apparatus, 21 outputting section, 22 display unit, 23 loudspeaker, 24 inputting section, 25 camera, 26 microphone, 27 sensor, 28 communication section, 29 broadcast reception section, 30 content playback section, 31 image sound synthesis section, 32 storage section, 33 content, 34 synthesis information, 35 image analysis section, 36 mirror image production section, 37 pointer detection section, 38 motion vector detection section, 39 matching section, 40 communication environment detection section, 41 standard time counting section, 42 operation inputting section, 43 control section, 44 session management section, 45 viewing recording level setting section, 46 playback synchronization section, 47 synthesis control section, 48 playback permission section, 49 recording permission section, 50 operation information outputting section, 51 electronic apparatus control section, 100 personal computer, 101 CPU, 111 recording medium

BEST MODE FOR CARRYING OUT THE INVENTION

In the following, a particular embodiment to which the present invention is applied is described in detail with reference to the drawings.

FIG. 1 shows an example of a configuration of a communication system to which the present invention is applied. In this communication system, a communication apparatus 1-1 establishes a connection to a different communication apparatus 1 (in the case of FIG. 1, a communication apparatus 1-2) through a communication network 2 to mutually communicate sound and an image of a user similarly as in the case of a visual telephone system and besides play back a common content (such as moving pictures, still pictures and so forth of, for example, a program content obtained by reception of a television broadcast or the like, a content of a movie or the like acquired by downloading or the like in advance, a private content transferred between users and so forth) in synchronism with the different communication apparatus 1-2 to support remote communication between the users. In the following description, where there is no necessity to distinguish the communication apparatus 1-1 and 1-2 from each other, each of them is referred to simply as communication apparatus 1.

Each communication apparatus 1 can be utilized simultaneously by a plurality of users. For example, in the case of FIG. 1, it is assumed that the communication apparatus 1-1 is used by users A and B while the communication apparatus 1-2 is used by a user X.

Figure 2B:
FIG. 2B is a view showing an example of an image of a content and an image of a user.
Figure 2C:
FIG. 2C is a view showing an example of an image of a content and an image of a user.

For example, it is assumed that the image of the common content is such as shown in FIG. 2A and the image of the user A picked up by the communication apparatus 1-1 is such as shown in FIG. 2B while the image of the user X picked up by the communication apparatus 1-2 is such as shown in FIG. 2C. In this instance, on a display unit 22 (FIG. 4) of the communication apparatus 1-1, the images of the content and the user are displayed in a superposed relationship in accordance with, for example, in a picture in picture (picture in picture) mode shown in FIG. 3A, a cross fade (cross fade) mode shown in FIG. 3B or a wipe (wipe) mode shown in FIG. 3C.

Figure 3A:
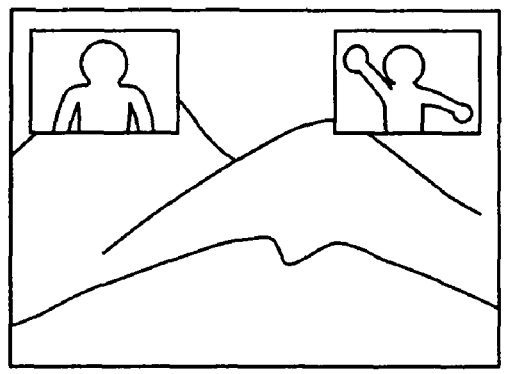
FIG. 3A is a view showing an example of synthesis of an image of a content and images of users.

It is to be noted that, in the picture in picture mode shown in FIG. 3A, the images of the users are superposed as small screens on the image of the content. The display positions and sizes of the small screens can be arbitrarily changed by the users. Also it is possible to display not both of the images of the user itself (user A) and the communication opposite party (user X) but display only one of the small screens. Further, the images may be displayed in an a blending mode such that the image of the content can be observed through the small screens of the images of the users.

Figure 3B:
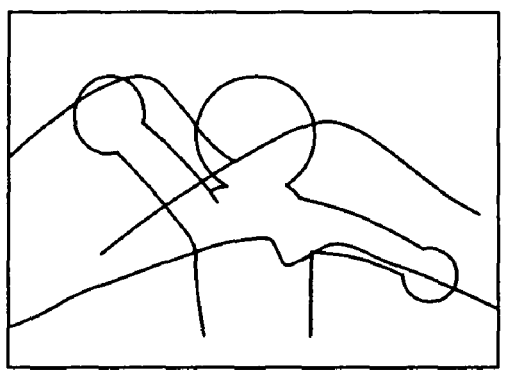
FIG. 3B is a view showing an example of synthesis of the image of the content and an image of a user.

In the cross fade mode shown in FIG. 3B, the image of a user (user A or user X) is displayed in an a blended manner on the image of the content. This cross fade mode can be used, for example, when the user points to an arbitrary position or region on the image of the content or in a like case.

Figure 3C:
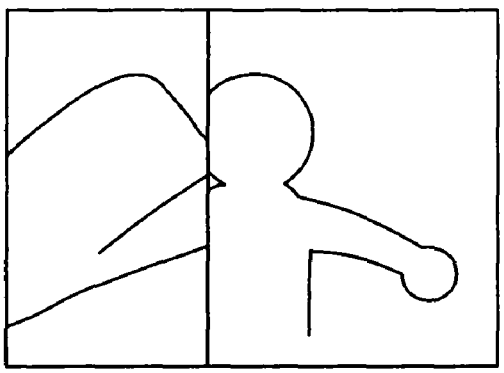
FIG. 3C is a view showing an example of synthesis of the image of the content and the image of the user.

In the wide mode shown in FIG. 3C, the image of the user appears from a predetermined direction in such a manner that it covers the image of the content.

It is to be noted that the images of the content and the users may be displayed applying a mode different from the modes described above. Similarly to images, also with regard to sound of the content and the users, the sounds are synthesized in sound volume and left-right balance and so forth based on setting of the users. The synthesis mode of the images and sounds of the content and the users can be changed at any time.

Synthesis situations of the images and the sounds of the content and the users such as, for example, the distinction among the picture in picture, cross fade and wide modes, the sizes and the positions of child pictures where the picture in picture mode is adopted, the transmission degree of the α blending where the cross face mode is adopted, the ratio in sound volume and so forth, can be set arbitrarily by the users. Parameters relating to the setting of the setting items are recorded as synthesis information 34 (FIG. 4) including information of time at which the setting is changed.

Referring back to FIG. 1, the communication network 2 is a broadband data communication network represented by the Internet or the like, and a content supplying server 3 supplies a content to the communication apparatus 1 through the communication network 2 in accordance with a request from the communication apparatus 1. An authentication server 4 performs processes for authentication, accounting and so forth when the user of the communication apparatus 1 tries to utilize the communication system.

A broadcasting apparatus 5 transmits a content as a program of a television broadcast or the like. Accordingly, the individually communication apparatus 1 can receive and play back a content broadcast from the broadcasting apparatus 5 in synchronism with each other. It is to be noted that transmission of a content from the broadcasting apparatus 5 to the communication apparatus 1 may be performed by wireless transmission or by wire transmission. Or, such transmission may be performed through the communication network 2.

A standard time information supplying apparatus 6 supplies standard time information for adjusting clocks (standard time counting section 41 (FIG. 4)) built in the communication apparatus 1 to standard time (world standard time, Japan standard time or the like) to the individual communication apparatus 1. It is to be noted that the supply of standard time information from the standard time information supplying apparatus 6 to the communication apparatus 1 may be performed by wireless communication or by wire communication. Further, the supply may be performed through the communication network 2.

Now, an example of a detailed configuration of the communication apparatus 1-1 is described with reference to FIG. 4.

In the communication apparatus 1-1, an outputting section 21 is formed from a display unit 22 and a loudspeaker 23, and displays an image and outputs sound corresponding to an image signal and a sound signal inputted thereto from an image sound synthesis section 31.

An inputting section 24 includes a camera 25 for picking up an image (moving picture or still picture) of a user, a microphone 26 for collecting sound of the user, and a sensor 27 for detecting surrounding environment information (brightness, temperature, humidity and so forth) of the user. The inputting section 24 outputs real-time (RT) data of the user including the acquired moving pictures, sound and surrounding environment information to a communication section 28 and a storage section 32. The camera 25 has a function which can measure the distance to an image pickup subject (user). Further, the inputting section 24 outputs the acquired image and sound of the user to the image sound synthesis section 31. Further, the inputting section 24 outputs the acquired image to an image analysis section 35. It is to be noted that a plurality of inputting apparatus 24 (in the case of FIG. 24, two inputting apparatus 24) may be provided such that they are directed to plurality of users (users A and B of FIG. 1).

The communication section 28 transmits real-time data of the user A inputted thereto from the inputting section 24 to the communication apparatus 1-2 of the communication opposite party through the communication network 2. Further, the communication section 28 receives real-time data of the user X transmitted from the communication apparatus 1-2 and outputs the real-time data to the image sound synthesis section 31, storage section 32 and image analysis section 35. Further, the communication section 28 receives a content supplied thereto from the communication apparatus 1-2 of the communication opposite party or the content supplying server 3 through the communication network 2 and outputs the content to a content playback section 30 and the storage section 32. Furthermore, the communication section 28 transmits a content 33 stored in storage section 32 or operation information produced by an operation information outputting section 50 to the communication apparatus 1-2 through the communication network 2.

A broadcast reception section 29 receives a television broadcast signal broadcast from the broadcasting apparatus 5 and outputs an acquired content as a broadcast program to the content playback section 30. The content playback section 30 plays back the content of the broadcast program received by the broadcast reception section 29, a content received by the communication section 28 or a content read out from the storage section 32 and outputs a resulting image and sound of the content to the image sound synthesis section 31 and the image analysis section 35.

The image sound synthesis section 31 synthesizes an image of a content inputted from the content playback section 30, an image of a user and an image for OSD (On Screen Display) by a blending or the like and outputs a resulting image signal to the outputting section 21. The image sound synthesis section 31 synthesizes sound of the content inputted from the content playback section 30 and sound of a user and outputs a resulting sound signal to the outputting section 21.

The storage section 32 stores real-time data of a user (user A or the like) supplied thereto from the inputting section 24, real-time data of the communication opposite party (user X) supplied thereto from the communication section 28, a content of a broadcast program received by the broadcast reception section 29 and a content supplied thereto from the communication section 28 while periodically adding standard time supplied thereto from the standard time counting section 41 to them through a control section 43. Further, the storage section 32 stores also synthesis information 34 produced by a synthesis control section 47.

The image analysis section 35 analyzes the brightness and the luminance of an image of a content inputted thereto from the content playback section 30 and images of users (including also an image of a user supplied from the communication apparatus 1-2) and outputs a result of the analysis to the synthesis control section 47. A mirror image production section 36 of the image analysis section 35 produces a mirror image of images of the users (including an image of a user received from the communication apparatus 1-2). A pointer detection section 37 detects a wrist, a finger tip or the like which is used as a pointer by a user for pointing to a desired position from within an image of the users (including an image of a user from the communication apparatus 1-2) detected by a motion vector detection section 38 and extracts an image of the pointer. Where an image from the inputting section 24 includes a plurality of users, a plurality of pointers are detected and coordinated with the users. The motion vector detection section 38 detects a motion vector indicative of a motion of each user from an image of users (including an image of a user from the communication apparatus 1-2) and identifies a generation point and a locus of the motion vector. A matching section 39 decides with which one of motions of the user estimated in advance the detected motion vector of the user coincides, and outputs a result of the decision as motion vector matching information to the control section 43.

A communication environment detection section 40 monitors the communication environment (communication rate, communication delay time and so forth) with the communication apparatus 1-2 through the communication section 28 and the communication network 2 and outputs a result of the monitoring to the control section 43. The standard time counting section 41 adjusts the standard time counted by the standard time counting section 41 itself based on standard time information supplied thereto from the standard time information supplying apparatus 6 and supplies the standard time to the control section 43. An operation inputting section 42 is formed from, for example, a remote controller or the like and accepts an operation of a user and then inputs a corresponding operation signal to the control section 43.

The control section 43 controls the components of the communication apparatus 1-1 based on an operation signal corresponding to an operation of a user inputted from the operation inputting section 42, motion vector matching information inputted from the image analysis section 35 and so forth. The control section 43 includes a session management section 44, a viewing recording level setting section 45, a playback synchronization section 46, a synthesis control section 47, a playback permission section 48, a recording permission section 49, an operation information outputting section 50 and an electronic apparatus control section 51. It is to be noted that control lines from the control section 43 to the components of the communication apparatus 1-1 are omitted in FIG. 4.

The session management section 44 controls a process by the communication section 28 of establishing a connection to the communication apparatus 1-2, content supplying server 3, authentication server 4 or the like through the communication network 2. The viewing recording level setting section 45 sets, based on a setting operation from a user, whether or not real-time data of the user acquired by the inputting section 24 can be played back by the communication apparatus 1-2 of the communication opposite party, whether or not the real-time data can be recorded and, where the real-time data can be recorded, the number of times by which recording is permitted. Then, the viewing recording level setting section 45 issues a notification of the setting information from the communication section 28 to the communication apparatus 1-2.

With the viewing recording level setting section 45, since it is possible to set a viewing level and a recording level for an image and sound of a user, leakage of a private image and sound can be prevented.

The playback synchronization section 46 controls the broadcast reception section 29 and the content playback section 30 so that the same content may be played back in synchronism with the communication apparatus 1-2 of the communication opposite party.

The synthesis control section 47 controls the image sound synthesis section 31 based on an analysis result of the image analysis section 35 and so forth so that an image and sound of a content and images and sound of users may be synthesized in accordance with a setting operation from the user. Further, the synthesis control section 47 produces synthesis information 34 which include parameters relating to setting of a synthesis situation of an image and sound of a content and images and sound of users such as, for example, a distinction among the picture in picture, cross face and wide modes, the size and the position of each child screen where the picture in picture mode is adopted, and the transmission degree, the ratio in sound volume and so forth of a blending when the cross fade mode is adopted, and information representative of the standard time at which the setting is changed. The synthesis control section 47 stores the produced synthesis information 34 into the storage section 32.

The playback permission section 48 decides based on license information and so forth added to a content whether or not playback of the content is permitted, and controls the content playback section 30 based on a result of the decision. The recording permission section 49 decides based on setting of the communication opposite party and license information added to a content whether or not recording of real-time data of the users and the content is permitted, and controls the storage section 32 based on a result of the decision. With the playback permission section 48 and the recording permission section 49, viewing and copy control in recording of a content can be performed.

The operation information outputting section 50 produces, in response to an operation by a user (a channel changeover operation upon reception of a television broadcast, or an operation for starting of playback, ending of playback, fast feeding playback or the like), operation information (whose details are hereinafter described) including the substance of the operation, the time of the operation and so forth. Then, the operation information outputting section 50 issues a notification of the operation information from the communication section 28 to the communication apparatus 1-2 of the communication opposite party. The operation information is utilized for synchronous playback of the content.

The electronic apparatus control section 51 controls a predetermined electronic apparatus (for example, a lighting fixture, an air conditioner, or the like; all not shown) connected (including radio connection) to the communication apparatus 1-1 based on motion vector matching information inputted from the image analysis section 35.

It is to be noted that an example of a detailed configuration of the communication apparatus 1-2 is similar to that of the communication apparatus 1-1 shown in FIG. 4, and therefore, description of the same is omitted herein.

Figure 5:
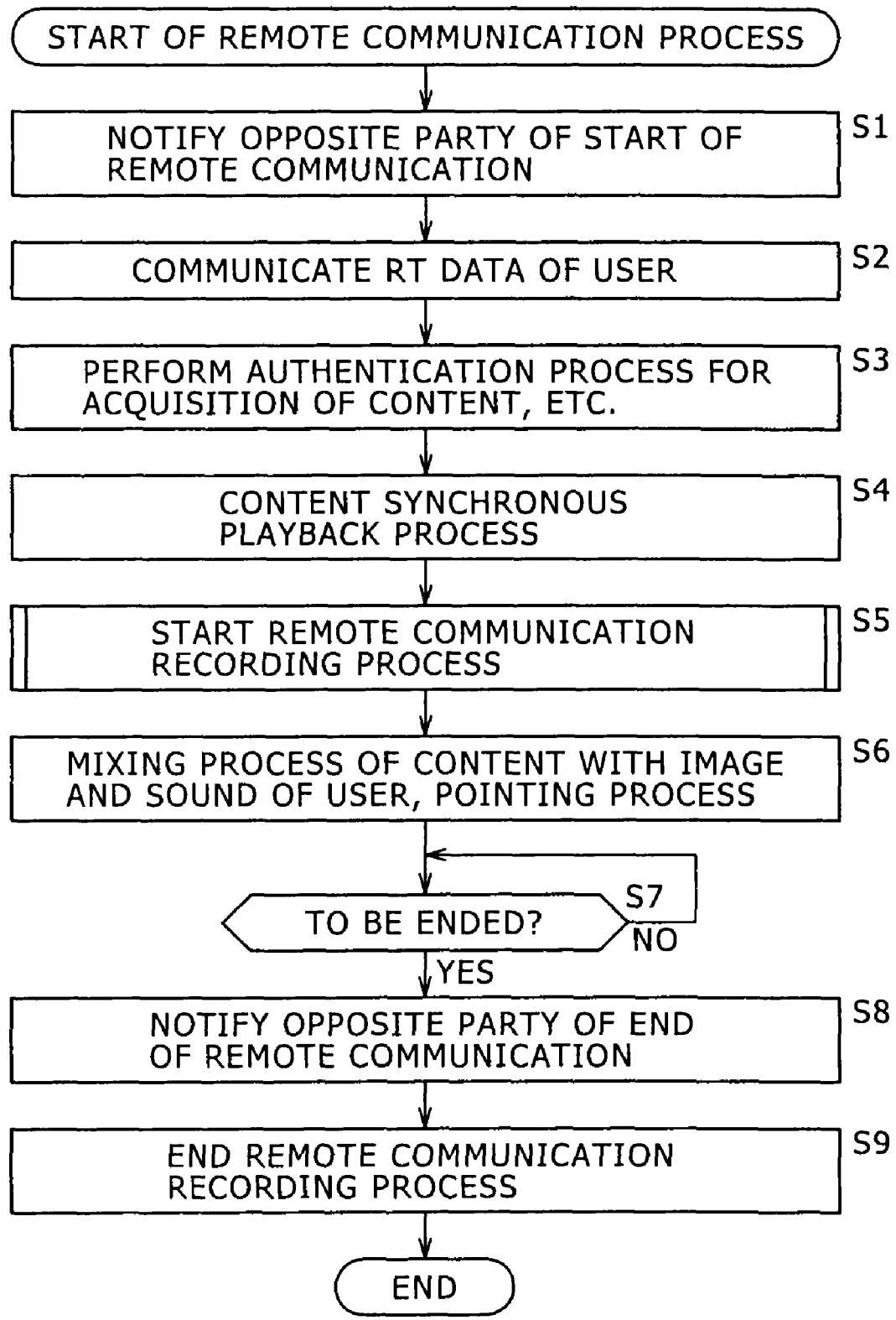
FIG. 5 is a flow chart illustrating a remote communication process by the communication apparatus.

Now, a remote communication process with the communication apparatus 1-2 by the communication apparatus 1-1 is described with reference to a flow chart of FIG. 5.

This remote communication process is started when an operation to instruct starting of remote communication with the communication apparatus 1-2 is inputted to the operation inputting section 42 and an operation signal corresponding to the operation is inputted to the control section 43.

At step S1, the communication section 28 establishes a connection to the communication apparatus 1-2 through the communication network 2 under the control of the session management section 44 and notifies the communication apparatus 1-2 of starting of remote communication. In response to the notification, the communication apparatus 1-2 returns acceptance of starting of remote communication.

At step S2, the communication section 28 begins to transmit real-time data of the user A and so forth inputted from the inputting section 24 to the communication apparatus 1-2 through the communication network 2 and starts reception of real-time data of the user X transmitted from the communication apparatus 1-2 under the control of the control section 43. Images and sound included in the transmitted real-time data of the user A and so forth and an image and sound included in the received real-time data of the user X are inputted to the storage section 32 and the image sound synthesis section 31.

At step S3, the communication section 28 establishes a connection to the authentication server 4 through the communication network 2 and performs an authentication process for acquisition of a content under the control of the session management section 44. After this authentication process, the communication section 28 accesses the content supplying server 3 through the communication network 2 to acquire a content designated by the user. It is assumed that, at this time, a similar process is executed also on the communication apparatus 1-2 and the same content is acquired.

It is to be noted that, where a content being broadcast as a television broadcast is to be received or where a content acquired already and stored in the storage section 32 is to be played back, the process at step S3 can be omitted.

At step S4, the content playback section 30 starts a playback process of the content synchronized with the communication apparatus 1-2 (such playback process is hereinafter referred to as content synchronous playback process) under the control of the playback synchronization section 46. In particular, the content playback section 30 issues a notification of an operation from the user (a channel changeover operation, a fast feeding playback starting operation or the like) so that the communication apparatus 1-2 may follow the communication apparatus 1-1.

At step S5, the storage section 32 starts a remote communication recording process. In particular, recording of the content whose playback is started, images and sound included in the transmitted real-time data of the user A and so forth, an image and sound included in the received real-time data of the user X and the synthesis information 34 produced by the synthesis control section 47 and representative of synthesis of the images and sound mentioned is started. Details of the remote communication recording process are hereinafter described with reference to FIG. 6.

At step S6, the image sound synthesis section 31 synthesizes an image and sound of the played back content, images and sound included in the transmitted real-time data of the user A and so forth and an image and sound included in the received real-time data of the user X, and supplies an image signal and a sound signal obtained as a result of the synthesis to the outputting section 21 under the control of the synthesis control section 47. The outputting section 21 displays an image corresponding to the image signal supplied thereto and outputs sound corresponding to the sound signal. At this stage, communication of images and sound between the users and synchronous playback of the content are started.

At step S6, in parallel to the processes of the image sound synthesis section 31 and so forth, the pointer detection section 37 of the image analysis section 35 executes a process (pointing process) of detecting the pointer of the user A and so forth based on the images included in the real-time data of the user A and so forth, displaying the pointers on the screen and so forth.

At step S7, the control section 43 decides whether or not an operation of issuing an instruction to end the remote communication is performed by the user, and waits that it is decided that the operation is performed. When it is decided that an operation of issuing an instruction to end the remote communication is performed by the user, the processing advances to step S8.

At step S8, the communication section 28 establishes a connection to the communication apparatus 1-2 through the communication network 2 and issues a notification to end the remote communication to the communication apparatus 1-2 under the control of the session management section 44. In response to the notification, the communication apparatus 1-2 returns acceptance of ending of the remote communication.

At step S9, the storage section 32 ends the communication recording process. The played back content, images and sound included in the real time data of the user A and so forth, image and sound included in the received real-time data of the user X and the synthesis information 34, which have been recorded till then, are utilized later when the present remote communication is reproduced.

The description of the remote communication process by the communication apparatus 1-1 is completed therewith.

It is to be noted that, while the foregoing description relates only to a case wherein the communication apparatus 1-2 follows the communication apparatus 1-1 (the communication apparatus 1-2 plays back a content in synchronism with the communication apparatus 1-1), it is possible to reverse the master-servant relationship or change the relationship at any time.

Further, while the foregoing description relates only to a case wherein one communication apparatus 1 (communication apparatus 1-2) follows the communication apparatus 1-1, a plurality of communication apparatus 1 may follow the communication apparatus 1-1. Further, the master-servant relationship may be reversed or changed at any time among a plurality of communication apparatus 1.

Figure 6:
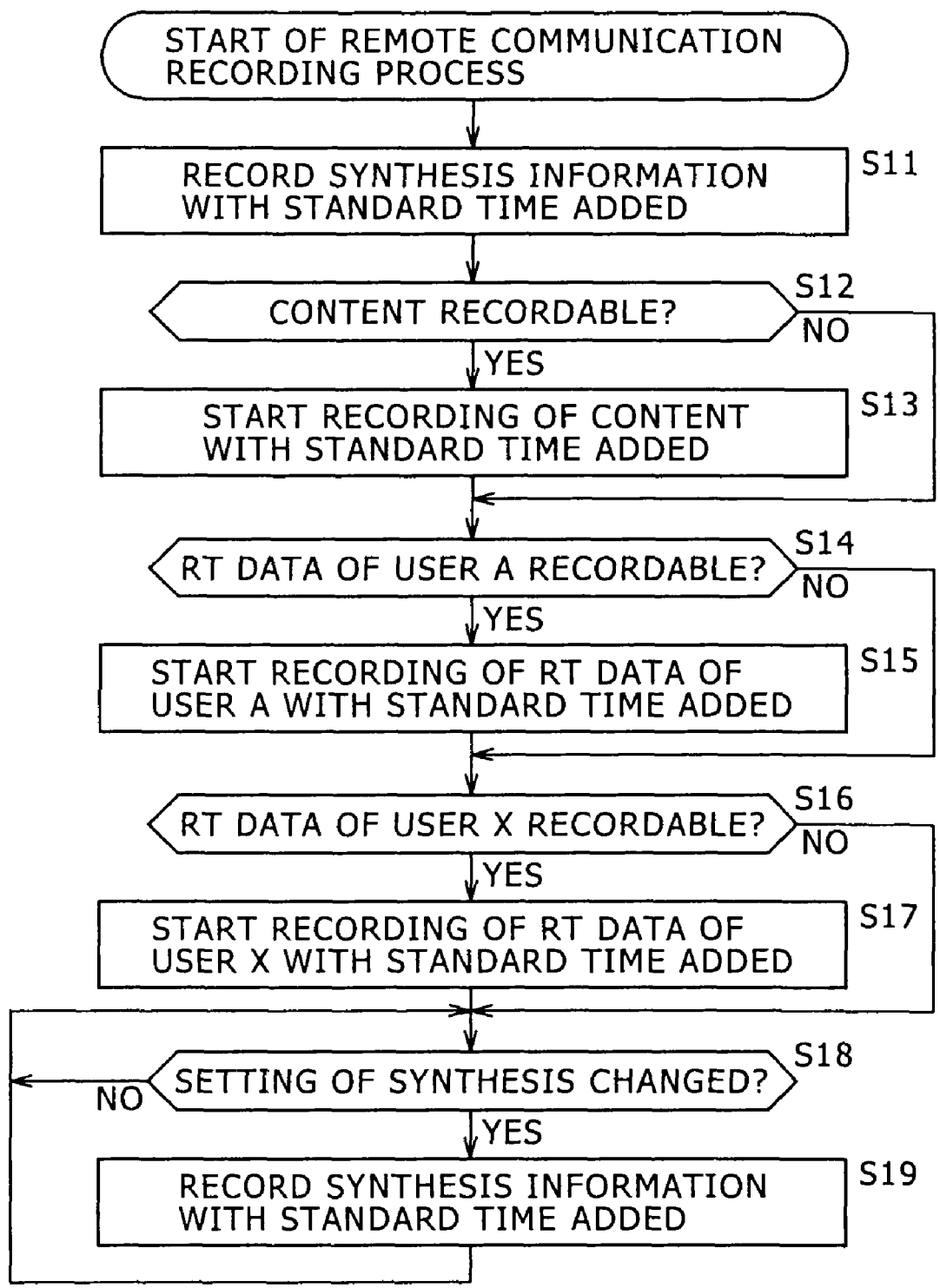
FIG. 6 is a flow chart illustrating a remote communication recording process at step S5 of FIG. 5.

Now, the remote communication recording process at step S5 of the remote communication process of FIG. 5 described hereinabove is described in detail with reference to FIG. 6.

At step S11, the synthesis control section 47 produces synthesis information 34 which includes parameters set by the user at the present stage and relates to a synthesis situation of an image and sound of a content and images and sound of users and information including the standard time at present and stores the synthesis information 34 into the storage section 32.

At step S12, the recording permission section 49 decides based on attribute information (metadata) and so forth of the content being currently played back whether or not the content being currently played back is recordable. If it is decided that the content being currently played back is recordable, then the processing advances to step S13. At step S13, the storage section 32 starts a process of storing the content being currently played back while periodically adding the standard time supplied from the standard time counting section 41 through the control section 43 to the content under the control of the recording permission section 49. It is to be noted that, if it is decided at step S12 that the content being currently played back is not recordable, then the step S13 is skipped.

At step S14, the recording permission section 49 decides based on the setting from the user whether or not the real-time data of the users (user A and so forth) are recordable. If it is decided that the real-time data of the user A and so forth are recordable, then the processing advances to step S15. At step S15, the storage section 32 starts a process of storing the real-time data of the user A and so forth while periodically adding the standard time supplied from the standard time counting section 41 through the control section 43 to the real-time data under the control of the recording permission section 49. It is to be noted that, if it is decided at step S14 that the real-time data of the user A are not recordable, then the step S15 is skipped.

At step S16, the recording permission section 49 decides, based on a notification from the communication apparatus 1-2, whether or not the real-time data of the user (user X) of the communication apparatus 1-2 are recordable. If it is decided that the real-time data of the user X are recordable, then the processing advances to step S17. At step S17, the storage section 32 starts a process of storing the real-time data of the user X while periodically adding the standard time supplied from the standard time counting section 41 through the control section 43 to the real-time data under the control of the recording permission section 49. It is to be noted that, if it is decided at step S16 that the real-time data of the user X are not recordable, then the step S17 is skipped.

It is to be noted that, although the process at steps S12 and S13, steps S14 and S15 and steps S16 and S17 are described in order for the convenience of description, actually they are performed in a changed order.

At step S18, the synthesis control section 47 decides whether or not the setting for synthesis of an image and sound of a content and images and sound of users is changed by the user, and waits that it is decided that the setting for synthesis is changed. If it is decided that the setting for synthesis is changed, then the processing advances to step S19. At step S19, the synthesis control section 47 produces synthesis information 34 including the parameters relating to the setting for the synthesis situation of an image and sound of a content and images and sound of users changed by the user and information indicative of the standard time at present and stores the synthesis information 34 into the storage section 32. Thereafter, the processing returns to step S18 so that the processes at the steps beginning with step S18 are repeated. Then, the remote communication process is continued until an operation to issue an instruction to end the remote communication is performed by the user as described above. The description of the remote communication recording process is completed therewith.

Now, a process (hereinafter referred to as remote communication reproduction process) of reproducing the remote communication based on the image and sound of a content, images and sound of users and synthesis information recorded by the remote communication recording process by the communication apparatus 1-1 is described with reference to a flow chart of FIG. 7. The remote communication reproduction process is started, for example, in response to an operation of the user for issuing an instruction to play back a content 33 stored in the storage section 32.

At step S31, the control section 43 decides whether or not an operation to issue an instruction to reproduce the remote communication is performed for the operation inputting section 42 by the user. If it is decided that an operation to issue an instruction to reproduce the remote communication is performed, then the processing advances to step S32.

At step S32, the synthesis control section 47 acquires the synthesis information stored in the storage section 32. At step S33, the synthesis control section 47 synchronizes the standard time included in the synthesis information, time information added to the content stored in the storage section 32 and time information added to the real-time data of the users with one another to start playback. Consequently, the image and sound of the content and the images and sound of the users are inputted to the image sound synthesis section 31. At step S34, the image sound synthesis section 31 synthesizes and outputs the image and sound of the content and the images and sound of the users to the outputting section 21 under the control of the synthesis control section 47 based on the synthesis information acquired at step S32. Consequently, the remote communication upon recording is reproduced completely.

It is to be noted that, when it is decided at step S31 that an operation to issue an instruction to reproduce the remote communication is not performed, the processing advances to step S35.

At step S35, the operation inputting section 42 accepts a setting operation from the user relating to the synthesis of the image and sound of the content and the images and sound of the users. At step S36, the synthesis control section 47 synchronizes the time information added to the content stored in the storage section 32 and the time information added to the real-time data of the users with each other to start playback. Consequently, the image and sound of the content and the images and sound of the users are inputted to the synthesis control section 47. At step S37, the image sound synthesis section 31 synthesizes and outputs the image and sound of the content and the images and sound of the users to the outputting section 21 under the control of the synthesis control section 47 corresponding to the result of setting by the process at step S35. The outputting of the image and sound of the content and the images and sound of the users is reproduced in a synthesized state different from that in the remote communication upon recording. It is to be noted that naturally it is possible to reproduce only the image and sound of the content.

The description of the remote communication reproduction process by the communication apparatus 1-1 is completed therewith.

Incidentally, while the processes by the communication apparatus 1-1 described above can be executed by hardware, they may otherwise be executed by software. Where the series of processes is executed by software, a program which constructs the software is installed from a program recording medium into a computer incorporated in hardware for exclusive use or, for example, such a general purpose personal computer as shown in FIG. 8 which can execute various functions by installing various programs.

The personal computer 100 includes a built-in CPU (Central Processing Unit) 101. An input/output interface 105 is connected to the CPU 101 through a bus 104. A ROM (Read Only Memory) 102 and a RAM (Random Access Memory) 103 are connected to the bus 104.

An inputting section 106 including inputting devices such as a keyboard, a mouse and so forth for being operated by a user to input an operation command an outputting section 107 for displaying an image and outputting sound, a storage section 108 formed from a hard disk drive or the like for storing a program, various data and so forth and a communication section 109 for executing a communication process through a network represented by the Internet are connected to the input/output interface 105. Further, a drive 110 which reads and writes data from and on a recording medium 111 such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory is connected to the input/output interface 105.

The program for causing the personal computer 100 to execute the processes of the communication apparatus 1 described hereinabove is supplied in a state wherein it is stored in the recording medium 111 to the personal computer 100. Then, the program is read out by the drive 110 and installed into the hard disk drive built in the storage section 108. The program installed in the storage section 108 is loaded into the RAM 103 from the storage section 108 in accordance with an instruction of the CPU 101 corresponding to a command from the user inputted to the inputting section 106. Then, the program loaded in the RAM 103 is executed.

It is to be noted that, in the present specification, the steps which are executed based on the program include not only processes which are executed in a time series in the order as described but also processes which may be but need not necessarily be processed in a time series but may be executed in parallel or individually without being processed in a time series.

The program may be processed by a single computer or may be processed discretely by a plurality of computers. Further, the program may be transferred to and executed by a computer at a remote place.

Further, in the present specification, the term system is used to represent an entire apparatus composed of a plurality of devices or apparatus.

The invention claimed is:

1. An information processing apparatus which communicates with a different information processing apparatus through a network, comprising:
    a playback section configured to play back content data in synchronism with the same content data being played back at the different information processing apparatus;
    a communication section configured to communicate sound and an image of a user with the different information processing apparatus through said network;
    a synthesis section configured to synthesize an image and sound of the content data played back by said playback section and the image and sound of the user based on a setting from the user;
    a storage section configured to store the content data, the image and sound of the user and synthesis information representative of a synthesis situation of the image and sound of the content data and the image and sound of the user; and
    a reproduction control section configured to control said playback section and said synthesis section based on the synthesis information stored in said storage section to reproduce a synthesized image of the image and sound of the content data and the image and sound of the user stored in said storage section,
    wherein time information representative of a time at which the synthesis is performed by said synthesis section is added to the content data stored by said storage section and to the image and sound of the user and time information representative of a time at which the synthesis information is produced, or representative of a time at which the setting of the synthesis situation is changed, is added to the synthesis information.

2. The information processing apparatus according to claim 1, wherein the setting from the user specifies a cross fade mode and values related to the cross fade mode that include at least one of a transmission degree and a ratio in sound volume of a blending.

3. An information processing method for causing an information processing apparatus to communicate with a different information processing apparatus through a network, comprising the steps of:
    playing back content data in synchronism with the different information processing apparatus;
    communicating sound and an image of a user with the same content data being played back at the different information processing apparatus through the network;
    synthesizing an image and sound of the content data played back by the process at the playback step and the image and sound of the user based on a setting from the user;
    storing the content data, the image and sound of the user and synthesis information representative of a synthesis situation of the image and sound of the content data and the image and sound of the user; and
    controlling the playback step and the synthesis step based on the synthesis information stored by the process at the storage step to reproduce a synthesized image of the image and sound of the content data and the image and sound of the user stored by the process at the storage step,
    wherein time information representative of a time at which the synthesis is performed by said synthesis section is added to the content data stored by said storage section and to the image and sound of the user and time information representative of a time at which the synthesis information is produced, or representative of a time at which the setting of the synthesis situation is changed, is added to the synthesis information.

4. The information processing method according to claim 3, wherein the setting from the user specifies a cross fade mode and values related to the cross fade mode that include at least one of a transmission degree and a ratio in sound volume of a blending.

5. A non-transitory computer-readable storage medium having computer readable program codes embodied in the computer readable storage medium for causing an information processing apparatus to communicate with a different information processing apparatus through a network, the computer readable program codes that, when executed, cause a computer to execute:
    playing back content data in synchronism with the same content data being played back at the different information processing apparatus;
    communicating sound and an image of a user with the different information processing apparatus through the network;
    synthesizing an image and sound of the content data played back by the process at the playback step and the image and sound of the user based on a setting from the user that specifies a cross fade mode and values related to the cross fade mode;
    storing the content data, the image and sound of the user and synthesis information representative of a synthesis situation of the image and sound of the content data and the image and sound of the user; and
    controlling the playback step and the synthesis step based on the synthesis information stored by the process at the storage step to reproduce a synthesized image of the image and sound of the content data and the image and sound of the user stored by the process at the storage step, wherein time information representative of a time at which the synthesis is performed is added to the stored content data and to the image and sound of the user and time information representative of a time at which the synthesis information is produced, or representative of a time at which the setting of the synthesis situation is changed, is added to the synthesis information.

6. The non-transitory computer readable storage medium according to claim 5, wherein the values related to the cross fade mode include at least one of a transmission degree and a ratio in sound volume of a blending.

7. A non-transitory computer-readable storage medium having computer readable program codes embodied in the computer readable storage medium for causing an information processing apparatus to communicate with a different information processing apparatus through a network, the computer readable program codes that, when executed, cause a computer to execute:

playing back content data in synchronism with the same content data being played back at the different information processing apparatus;

communicating sound and an image of a user with the different information processing apparatus through the network;

synthesizing an image and sound of the content data played back by the process at the playback step and the image and sound of the user based on a setting from the user;

storing the content data, the image and sound of the user and synthesis information representative of a synthesis situation of the image and sound of the content data and the image and sound of the user; and controlling the playback step and the synthesis step based on the synthesis information stored by the process at the storage step to reproduce a synthesized image of the image and sound of the content data and the image and sound of the user stored by the process at the storage step, wherein time information representative of a time at which the synthesis is performed is added to the stored content data and to the image and sound of the user and time information representative of a time at which the synthesis information is produced, or representative of a time at which the setting of the synthesis situation is changed, is added to the synthesis information.

* * * * *